(12) United States Patent
Beckwith et al.

(10) Patent No.: US 6,656,548 B1
(45) Date of Patent: Dec. 2, 2003

(54) LAMINATED COOK-IN FILM

(75) Inventors: Scott W. Beckwith, Greer, SC (US);
Ram K. Ramesh, Greenville, SC (US);
Michael J. Rosinski, Woodruff, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/582,517

(22) PCT Filed: Dec. 22, 1998

(86) PCT No.: PCT/US98/27389

§ 371 (c)(1),
(2), (4) Date: Sep. 18, 2000

(87) PCT Pub. No.: WO99/33653

PCT Pub. Date: Jul. 8, 1999

Related U.S. Application Data

(60) Provisional application No. 60/070,006, filed on Dec. 30, 1997.

(51) Int. Cl.⁷ .............................. B65B 53/00; F16B 4/00
(52) U.S. Cl. .................... 428/34.9; 428/34.8; 428/35.4; 428/35.2; 428/36.9; 428/36.91; 428/475.8; 428/476.1; 428/516; 428/518
(58) Field of Search ................................ 426/105, 127, 426/129, 135; 428/36.7, 35.4, 34.8, 34.9, 35.2, 36.8, 36.91, 412, 516, 518, 483, 475.8, 476.1, 36.9

(56) References Cited

U.S. PATENT DOCUMENTS

| | | | |
|---|---|---|---|
| 3,369,911 A | 2/1968 | Von Witzleben | 99/176 |
| 4,064,296 A | 12/1977 | Bornstein et al. | 428/35 |
| 4,400,428 A | 8/1983 | Rosenthal et al. | 428/349 |
| 4,421,823 A | 12/1983 | Theisen et al. | 428/349 |
| 4,448,792 A | 5/1984 | Schirmer | 426/113 |
| 4,495,249 A | 1/1985 | Ohya et al. | 428/516 |
| 4,542,075 A | 9/1985 | Schirmer | 428/516 |
| 4,568,580 A | 2/1986 | Ghirardello et al. | 428/35 |
| 4,605,460 A | 8/1986 | Schirmer | 156/229 |
| 4,606,922 A | 8/1986 | Schirmer | 426/412 |
| 4,647,483 A | 3/1987 | Tse et al. | 428/34 |
| 4,803,122 A | 2/1989 | Schirmer | 428/349 |
| 4,855,103 A | 8/1989 | Ekbom | 419/26 |
| 4,855,183 A | 8/1989 | Oberle | 428/345 |
| 4,892,765 A | 1/1990 | Hisazumi et al. | 428/34.8 |
| 4,937,112 A | 6/1990 | Schirmer | 428/34.3 |
| 4,971,845 A | * 11/1990 | Aaker et al. | 428/34.9 |
| 5,011,735 A | 4/1991 | Schirmer | 428/349 |
| 5,037,683 A | 8/1991 | Schirmer | 428/36.7 |

(List continued on next page.)

FOREIGN PATENT DOCUMENTS

| | | | | |
|---|---|---|---|---|
| EP | 0 331 509 | * | 6/1989 | B32B/27/08 |
| EP | 0 331 509 A2 | | 9/1989 | B32B/27/08 |
| EP | 0 334 291 A2 | | 9/1989 | B32B/27/08 |
| EP | 0 589 436 A1 | | 3/1994 | C08L/23/04 |
| WO | 97/12758 | | 4/1997 | B32B/27/34 |
| WO | 97/280476 A1 | | 8/1997 | B65B/25/06 |
| WO | 98/31731 | | 7/1998 | C08J/7/04 |

*Primary Examiner*—Harold Pyon
*Assistant Examiner*—Michael C. Miggins
(74) *Attorney, Agent, or Firm*—Daniel B. Ruble

(57) ABSTRACT

A laminate comprising first and second polymeric films. One of the films is heat shrinkable and the other of the first and second films is non-heat shrinkable. At least one of the first and second films has an oxygen permeance of no more than about 150 cm³/m²·atm·24 hours at 23° C. and 0% relative humidity. The first film comprises an outer layer which, even when untreated, has a surface energy of at least 0.034 J/m², and at least about 10 weight percent of one or more polymers having a Vicat softening point of at least about 65° C. The first film outer layer forms a first outer surface of the laminate. The outer layer of the second film forms the second outer surface of the laminate. The laminate has an improved ability to be sealed about a forming shoe without necking down.

21 Claims, 2 Drawing Sheets

U.S. PATENT DOCUMENTS

| | | | |
|---|---|---|---|
| 5,089,073 A | 2/1992 | Schirmer | 156/244.11 |
| 5,185,189 A | 2/1993 | Stenger et al. | 428/34.8 |
| 5,374,459 A | 12/1994 | Mumpower et al. | 428/36.7 |
| 5,460,878 A | 10/1995 | Hostetter | 428/349.1 |
| 5,462,756 A | 10/1995 | Raines et al. | 426/129 |
| 5,480,690 A | 1/1996 | Stenger et al. | 428/34.8 |
| 5,926,989 A | 7/1999 | Oliver, Sr. | 42/70.11 |
| 6,221,410 B1 * | 4/2001 | Ramesh et al. | 426/105 |

* cited by examiner

LAMINATED COOK-IN FILM

This application is the National Stage (35 U.S.C. §371) of International Application No. PCT/US98/27389 filed Dec. 22, 1998, which claims the benefit of U.S. Provisional Application No. 60/070,006 filed Dec. 30, 1997.

BACKGROUND INFORMATION

1. Field of the Invention

This invention relates generally to food packaging films, more particular to films in which packaged food products can be cooked.

2. Background of the Invention

Many food products are processed in thermoplastic film packages by subjecting the packaged product to elevated temperatures produced by, for example, immersion in hot water or exposure to steam. Such thermal processing often is referred to as cook-in, and films used in such processes are known as cook-in films.

A food product that is packaged and processed in this manner can be refrigerated, shipped, and stored until the food product is to be consumed or, for example, sliced and repackaged into smaller portions for retail display.

Many sliced luncheon meats are processed in this fashion. Alternatively, the processed food can be removed immediately from the cook-in package for consumption or further processing (e.g., sliced and repackaged).

A cook-in film must be capable of withstanding exposure to rather severe temperature conditions for extended periods of time while not compromising its ability to contain the food product. Cook-in processes typically involve a long cook cycle. Submersion in hot (i.e., about 55° to 65° C.) water for up to about 4 hours at is common; submersion in 70° to 100° C. water or exposure to steam for up to 12 hours is not uncommon, although most cook-in procedures normally do not involve temperatures in excess of about 90° C. During such extended periods of time at elevated temperatures, any seams in a package formed from a cook-in film preferably resist failure (i.e., pulling apart).

Following the cook-in process, the film or package preferably conforms, if not completely then at least substantially, to the shape of the contained food product. Often, this is achieved by allowing the film to heat shrink under cook-in conditions so as to form a tightly fitting package. In other words, the cook-in film desirably possesses sufficient shrink energy such that the amount of thermal energy used to cook the food product also is adequate to shrink the packaging film snugly around the contained product. Alternatively, the cook-in film package can be caused to shrink around the contained food product prior to initiating the cook-in procedure by, for example, placing the package in a heated environment prior to cooking.

The cook-in film also preferably possesses sufficient adherence to the food product to inhibit or prevent "cook-out" (sometimes referred to as "purge"), which is water and/or juices that collect between the surface of the contained food product and the food-contact surface of the packaging material during the cook-in process. Preventing cook-out can increase product yield, provide a better tasting product, improve shelf life and provide a more aesthetically appealing packaged product. Films that adhere well to the packaged food product help reduce cook-out.

Many cook-in films are corona treated to increase the surface energy of their food-contact layers. However, corona treatment can be inconsistent, can result in a film with inconsistent adhesion, can result in a film having a surface energy that decays over time, and can interfere with the sealability of a film.

Many types of meat are processed by a cook-in procedure. Common examples include ham, sausage, some types of poultry, mortadella, bologna, braunschweiger, and the like. However, such meats can vary substantially in fat and protein content. Obtaining adequate film-to-meat adhesion becomes more difficult with respect to meats that are high in fat, low in protein, or have substantial levels of additives (starch, water, etc.). Adhesion of the film to the meat product is believed to be due to polar functionalities of the protein being attracted to polar functionalities on the surface of the cook-in film. For example, poultry has a relatively low fat content and a relatively high protein content; therefore, obtaining adequate film-to-poultry meat adhesion is relatively easy. However, ham, sausage, mortadella, bologna, braunschweiger and the like have relatively high fat contents and relatively low protein content; therefore, obtaining adequate film-to-meat adhesion for such meat products (especially sausage, mortadella, bologna, and braunschweiger) is more difficult.

Some presently available cook-in films provide excellent adhesion with the meat product and do a good job of reducing cook-out. Additionally, most presently used films are able to withstand extended time periods at the elevated temperatures described supra; accordingly such films are adequate for many cook-in applications. However, some cook-in applications impose even more stringent performance requirements. For example, some food products that are processed via cook-in procedures are oxygen sensitive. Cook-in films for these products need to include one or more oxygen barrier layers. Other cook-in applications require that the film or the package made therefrom be printable and be able to retain any image printed thereon.

One of the most troublesome of these performance requirements is durability when used in conjunction with a forming shoe (during the package forming process). Where a film has a high degree of shrinkability in the transverse direction, it tends to "neck down" on the forming shoe during the sealing step of the process. This often causes such highly shrinkable films to rupture.

No presently available cook-in film is believed to possess all of the following characteristics: (1) good adherence to protein, (2) an extremely low permeance to oxygen, (3) an ability to shrink around a packaged product in a controlled fashion, (4) a seal layer with a softening point that is sufficiently high to survive cook-in conditions, (5) an ability to be sealed around a forming shoe without necking down, (6) good resistance to clip cuts, and (7) an ability to be printed in such a manner that the printed image is protected during the cook-in process as well as in subsequent transport and handling.

SUMMARY OF THE INVENTION

Briefly, the present invention provides a multilayer structure that includes a first polymeric film laminated to a second polymeric film. At least one of the films includes a barrier layer with an oxygen permeance of no more than about 150 $cm^3/m^2 \cdot atm \cdot 24$ hours at about 23° C. and 0% relative humidity. (The units for oxygen permeance as used herein throughout are fairly common in the industry. To convert these to SI units, $mol/m^2 \cdot s \cdot Pa$, one need only multiply by a factor of $5.097 \times 10^{-15}$.) Each of the polymeric films include an outer layer that forms an outer surface of the multilayer structure (i.e., an outer layer of the first polymeric film forms one outer surface of the multilayer structure while an outer layer of the second polymeric film forms the other outer surface of the multilayer structure). The aforementioned outer layer of the first polymeric film, even when untreated, has a surface energy of at least 0.034 J/m$^2$ and includes at least about 10% (by wt.) of a polymer having a Vicat softening point of at least about 65° C. The outer surface of the multilayer structure formed from the outer layer of the first polymeric film (i.e., the first outer surface) can be sealed to itself, the opposite outer surface (i.e., the second outer surface), or an optional adhesive tape applied over a butt-seam juncture formed by contacting the first outer surface with itself. Each of the foregoing sealing techniques can result in the formation of a tube which, through further sealing and cutting techniques well known to those of ordinary skill in the art, can result in packages.

In another aspect, the present invention provides a multilayer structure that includes a first polymeric film laminated to a second polymeric film, at least one of which includes a barrier layer with an oxygen transmission coefficient of no more than about 150 cm$^3$/m$^2$·atm·24 hours at about 23° C. and 0% relative humidity. Each of the polymeric films includes an outer layer that forms an outer surface of the multilayer structure. The aforementioned outer layer of the first polymeric film includes at least one of (1) a polymer that includes mer units derived from a C$_2$–C$_4$ α-olefin and at least 2 weight percent mer units derived from a C$_3$–C$_{18}$ unsaturated acid, (2) an anhydride-modified polymer that includes mer units derived from a C$_2$–C$_4$ α-olefin, (3) a polymer that includes mer units derived from lactic acid, (4) a polyamide, (5) a polyester, and (6) a polyurethane. The sealing characteristics and capabilities of the outer surfaces of this multilayer structure are the same as those set forth for the multilayer structure defined in the previous paragraph.

Both of the multilayer structures just described are believed to possess each of the six characteristics set forth in the previous section of this document. As such, they are ideal for use as films for use in many, if not all, cook-in applications.

To assist in understanding the more detailed description of the invention that follows, certain definitions are provided immediately below. These definitions apply herein throughout unless a contrary intention is explicitly indicated:

"polymer" means the polymerization product of one or more monomers and is inclusive of homopolymers as well as copolymers, terpolymers, tetrapolymers, etc., and blends and modifications of any of the foregoing;

"mer unit" means that portion of a polymer derived from a single reactant molecule; for example, a mer unit from ethylene has the general formula —CH$_2$CH$_2$—;

"homopolymer" means a polymer consisting essentially of a single type of repeating mer unit;

"copolymer" means a polymer that includes mer units derived from two reactants (normally monomers) and is inclusive of random, block, segmented, graft, etc., copolymers;

"interpolymer" means a polymer that includes mer units derived from at least two reactants (normally monomers) and is inclusive of copolymers, terpolymers, tetrapolymers, and the like;

"polyolefin" means a polymer in which some mer units are derived from an olefinic monomer which can be linear, branched, cyclic, aliphatic, aromatic, substituted, or unsubstituted (e.g., olefin homopolymers, interpolymers of two or more olefins, copolymers of an olefin and a non-olefinic comonomer such as a vinyl monomer, and the like);

"(meth)acrylic acid" means acrylic acid and/or methacrylic acid;

"(meth)acrylate" means acrylate and/or methacrylate;

"anhydride functionality" means any group containing an anhydride moiety, such as that derived from maleic acid, fumaric acid, etc., whether blended with one or more polymers, grafted onto a polymer, or polymerized with one or more monomers;

"oxygen permeance" (in the packaging industry, "permeance" often is referred to as "transmission rate") means the volume of oxygen (O$_2$) that passes through a given cross section of film (or layer of a film) at a particular temperature and relative humidity when measured according to a standard test such as, for example, ASTM D 1434 or D 3985;

"longitudinal direction" means that direction along the length of a film, i.e., in the direction of the film as it is formed during extrusion and/or coating;

"transverse direction" means that direction across the film and perpendicular to the machine direction;

"free shrink" means the percent dimensional change, as measured by ASTM D 2732, in a 10 cm×10 cm specimen of film when subjected to heat;

as a verb, "laminate" means to affix or adhere (by means of, for example, adhesive bonding, pressure bonding, corona lamination, and the like) two or more separately made film articles to one another so as to form a multilayer structure; as a noun, "laminate" means a product produced by the affixing or adhering just described;

"directly adhered," as applied to film layers, means adhesion of the subject film layer to the object film layer, without a tie layer, adhesive, or other layer therebetween;

"between," as applied to film layers, means that the subject layer is disposed in the midst of two object layers, regardless of whether the subject layer is directly adhered to the object layers or whether the subject layer is separated from the object layers by one or more additional layers;

"inner layer" or "internal layer" means a layer of a film having each of its principal surfaces directly adhered to one other layer of the film;

"outer layer" means a layer of a film having less than both of its principal surfaces directly adhered to other layers of the film;

"inside layer" means the outer layer of a film in which a product is packaged that is closest, relative to the other layers of the film, to the packaged product;

"outside layer" means the outer layer of a film in which a product is packaged that is farthest, relative to the other layers of the film, from the packaged product;

"barrier layer" means a film layer capable of excluding one or more gases (e.g., O$_2$);

"abuse layer" means an outer layer and/or an inner layer that resists abrasion, puncture, and other potential causes of reduction of package integrity and/or appearance quality;

"tie layer" means an inner layer having the primary purpose of providing interlayer adhesion to adjacent layers that include otherwise nonadhering polymers;

"bulk layer" means any layer which has the purpose of increasing the abuse resistance, toughness, modulus, etc., of a multilayer film and generally comprises polymers that are inexpensive relative to other polymers in the film which provide some specific purpose unrelated to abuse resistance, modulus, etc.;

"seal layer" (or "sealing layer" or "heat seal layer" or "sealant layer") means;
(a) with respect to lap-type seals, one or more outer film layer(s) (in general, up to the outer 75 $\mu$m of a film can be involved in the sealing of the film to itself or another layer) involved in the sealing of the film to itself, another film layer of the same or another film, and/or another article which is not a film, or
(b) with respect to fin-type seals, an inside film layer of a package, as well as supporting layers within 75 $\mu$m of the inside surface of the innermost layer, involved in the sealing of the film to itself;

as a noun, "seal" means a bond of a first region of a film surface to a second region of a film surface (or opposing film surfaces) created by heating (e.g., by means of a heated bar, hot air, infrared radiation, ultrasonic sealing, etc.) the regions (or surfaces) to at least their respective softening points;

"clip cut" means a reduction in package integrity due to either or both of the film gathering device and the application of a wire or preformed clip used to seal an end of the package; and "cook" means to heat a food product thereby effecting a change in one or more of the physical or chemical properties thereof (e.g., color, texture, taste, and the like).

Films used in the food packaging industry often are categorized according to the number of layers that make up the film. Some films are made from a single polymer or blend of polymers and thus have only one layer. However, most films include more than one layer and are referred to as multilayer films. In general, the layers of a multilayer film can be classified as inner or outer layers. Normally, inner layers are included to provide additional or different properties to the film. In addition, any number of tie layers can be included in the film. Such tie layers can be present primarily on the outside of an inner layer or can be a layer itself. Many tie layers include one or more modified polyolefins and/or polyurethanes, more preferably modified ethylene/α-olefin copolymer, modified ethylene/unsaturated ester copolymer, and/or modified ethylene/unsaturated acid copolymer. Anhydride-modified ethylene/α-olefin copolymer and anhydride-modified ethylene/unsaturated ester copolymer are particularly preferred. Specific examples include anhydride-grafted linear low density polyethylene and anhydride-grafted ethylene/vinyl acetate copolymer.

With respect to films used for cook-in processes in general, one outer layer acts as a food-contact layer while the other acts as an outside layer. The former serves as the inner layer of a package formed from the film and is in direct contact with the packaged food product. The latter provides abuse resistance by serving as the outermost layer of the package.

Some films, including many which are used in cook-in processes, are oriented prior to use. Orientation involves stretching a film at an elevated temperature (the orientation temperature) followed by setting the film in the stretched configuration (e.g., by cooling). When an unrestrained, unannealed, oriented polymeric film subsequently is heated to its orientation temperature, heat shrinkage occurs and the film returns almost to its original, i.e., pre-oriented, dimensions.

An oriented film has an orientation ratio, which is the multiplication product of the extent to which the film has been expanded in several directions, usually two directions perpendicular to one another. Expansion in the longitudinal direction, sometimes referred to as the machine direction, occurs in the direction the film is formed during extrusion and/or coating. Expansion in the transverse direction means expansion across the width of the film and is perpendicular to the longitudinal direction.

DETAILED DESCRIPTION OF ILLUSTRATIVE EMBODIMENTS

The multilayer structure of the present invention involves at least two films which have been bonded so as to form an integral structure. At least one of the films includes a barrier layer, more specifically, a layer that has an oxygen permeance of no more than about 150 cm$^3$/m$^2$·atm·24 hours at about 23° C. (73° F.) and 0% relative humidity. The presence of such a layer helps to ensure that the multilayer structure of the present invention can be used for those cook-in applications where exclusion of oxygen from the food product before, during, and/or after cooking is desirable.

Additionally, at least one of the films has an outer layer that inherently possesses a surface energy of at least 0.034 J/m$^2$, more preferably at least 0.038 J/m$^2$, even more preferably at least 0.040 J/m$^2$, and most preferably at least 0.042 J/m$^2$. ("Inherently possesses" means that the film does not require treatment to achieve the stated level of surface energy.) Although this outer layer can be treated to further enhance its surface energy, by requiring its inherent surface energy be relatively high (i.e., at least 0.034 J/m$^2$), an advantage has been realized. Surface layers that require treatment to raise their surface energies (e.g., to increase their adhesion to an enclosed food product) frequently lose some of that increase during processing. Specifically, as a film containing such a surface layer is formed into a package by being wrapped around a forming shoe, some of the surface functionalities created by the treatment process can be buffed off. (This buffing phenomenon generally occurs most frequently in films having a relatively high shrink force, i.e., those films having a transverse free shrink of at least 5% and particularly those films having a transverse free shrink of at least about 7.5%.) However, because the outer layer described herein has an inherently high surface energy (i.e., the functionalities are inherent in the polymer(s) from which the outer layer is/are formed as opposed to being created after the layer is made), the film of the present invention does not suffer a similar buffing problem.

In general, the multilayer structure of the present invention can have any total thickness as long as it provides the desired properties for the particular packaging operation in which it is to be used. Nevertheless, the multilayer structure of the present invention preferably has a total thickness (i.e., a combined thickness of all layers) of from about 5 to about 500 µm, more preferably of from about 10 to about 250 µm, even more preferably from about 25 to about 200 µm. It also preferably has a Young's modulus ranging from about 34 to about 3400 MPa, more preferably from about 70 to about 2100 MPa, and most preferably from about 280 to about 1400 MPa.

Figure 1:
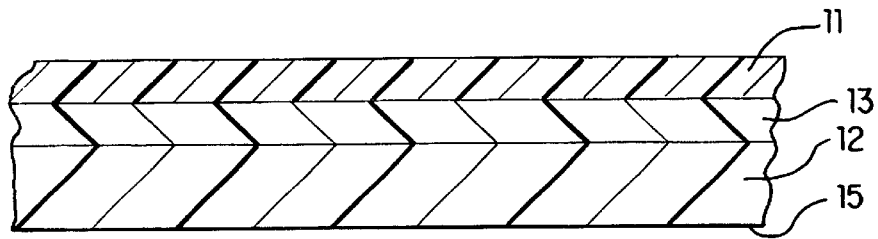
FIG. 1 is a greatly enlarged cross sectional view of one embodiment of a multilayer structure according to the present invention.

Referring to FIG. 1, multilayer structure 10 includes first polymeric film 11 and second polymeric film 12. As exemplified in FIG. 1, both of films 11 and 12 are monolayer films, although either or both can be multilayer films. The surface of first polymeric film 11 that is most distant from second polymeric film 12 forms one outer surface 14 of multilayer structure 10; the surface of second polymeric film 12 that is most distant from first polymeric film 11 forms the other outer surface 15 of multilayer structure 10.

First polymeric film 11 and second polymeric film 12 are monolayer films; therefore, their sole layers are, according to the definitions set forth previously, outer layers. Accordingly, one of polymeric film 11 and second polymeric film 12 has a surface energy, even when untreated, of at least 0.034J/m$^2$ and includes at least 10% (by wt.) of one or more polymers having a Vicat softening point of at least about 65° C. while the other has an oxygen permeance of no more than about 150 cm$^3$/m$^2$·atm·24 hours at about 23° C. (73° F.) and 0% relative humidity. To simplify the following discussion, first polymeric film 11 will be assumed to meet the surface energy and softening point requirements while second polymeric film 12 will be assumed to have the required oxygen permeance.

First polymeric film 11 preferably has a thickness of from about 1 to about 125 µm, more preferably from about 2.5 to about 50 µm, even more preferably from about 5 to about 25 µm, and most preferably from about 7.5 to about 20 µm. Second polymeric film 12 preferably has a thickness of from about 0.5 to about 75 µm, more preferably from about 1 to about 50 µm, even more preferably from about 2.5 to about 25 µm, and most preferably from about 5 to about 15 µm.

First polymeric film 11 has a relatively high surface energy, even in the absence of a surface treatment (e.g., corona treating). Specifically, its surface energy (untreated) is at least 0.034 J/m$^2$, preferably at least 0.036 J/m$^2$, more preferably at least 0.038 J/m$^2$, even more preferably at least 0.040 J/m$^2$, and most preferably at least 0.042 J/m$^2$. As discussed supra, films with high surface energies normally adhere better to food products. Accordingly, in multilayer structure 10, first polymeric film 11 acts as the food-contact layer.

First polymeric film 11 also includes one or more polymers having a Vicat softening point that is high enough to withstand cook-in temperatures (i.e., its softening point is above that temperature at which the food product is to be cooked) but low enough to seal easily when subjected to normal heat sealing conditions. Specifically, first polymeric film 11 includes at least about 10% (by wt.), preferably at least about 25% (by wt.), more preferably at least about 50% (by wt.), most preferably at least about 75% (by wt.) of at least one polymer having a Vicat softening point of at least about 65° C., preferably at least about 70° C., and more preferably at least about 75° C. Therefore, in addition to acting as the food-contact layer, outer surface 14 of first polymeric film 11 is involved in the sealing of multilayer structure 10 so as to form the desired cook-in package. (See infra for further description.)

In a preferred embodiment, the polymer(s) providing first polymeric film 11 with its high surface energy also has the aforementioned Vicat softening point.

At least six classes of polymers that have the required Vicat softening point and provide the desired surface energy discussed supra have been identified. The first of these classes of polymers are interpolymers of one or more $C_2$–$C_4$ α-olefins (i.e., ethylene, propylene, and 1-butene) and one or more $C_3$–$C_{18}$ unsaturated acids. Mer units derived from the $C_3$–$C_{18}$ unsaturated acid(s) make up at least 2 weight percent of the interpolymer. Of the aforementioned α-olefins, ethylene is preferred. Useful unsaturated acids have the general formula $CH_2$=CRCOOH where R is hydrogen or a $C_1$–$C_{15}$, preferably $C_1$–$C_{10}$, more preferably $C_1$–$C_5$ alkyl, cycloalkyl, aryl, alkoxy, etc., group. The specific identity of the R group is unimportant as long as it does not interfere with the ability of the unsaturated acid to copolymerize with the α-olefin and the resulting interpolymer has the properties discussed previously. Preferred unsaturated acids include methacrylic acid and acrylic acid, with the latter being particularly preferred. Regardless of the identity of the α-olefin(s) and the unsaturated acid(s), the resulting interpolymer preferably has a melt index of from about 0.25 to about 50, more preferably from about 0.5 to about 10, and still more preferably from about 1 to about 5.

As mentioned previously, in one preferred embodiment, the polymer(s) providing first polymeric film 11 with its high surface energy also has the required Vicat softening point (i.e., at least about 65° C., preferably at least about 70° C., most preferably at least about 75° C.). For some applications, those polymers having a Vicat softening point (V) defined by the formula $$V \geq 111° C. - 2.78° C.(m_A)$$

where $m_A$ is the percent of mer units in the interpolymer derived from the unsaturated acid, ranging from about 2 to about 25, preferably ranging from about 4 to about 15, more preferably ranging from about 6 to about 12 (with all of the foregoing ranges being inclusive of the end point values), can be preferred. The y intercept value of the Vicat softening point in the above formula more preferably is 113° C., even more preferably 115° C., yet more preferably 117° C., and most preferably 120° C. Preferred α-olefin/unsaturated acid interpolymers include NUCREL™ ARX 84-1 and ARX 84-2 ethylene/acrylic acid copolymers (DuPont de Nemours; Wilmington, Del.), which exhibit Vicat softening points of about 97° C. and 100° C., respectively. (The former includes about 6% (by wt.) mer units derived from acrylic acid, whereas the latter includes about 7% (by wt.) mer units derived from acrylic acid.)

The second class of polymers that have Vicat softening points in the required range and surface energy characteristics are polyolefins that include anhydride functionality either in or pendent from the backbone of the polymer. In general, this class of polyolefins includes interpolymers of one or more $C_2$–$C_4$ α-olefins (i.e., ethylene, propylene, and 1-butene) and one or more unsaturated acids or anhydrides, interpolymers of one or more $C_2$–$C_4$ α-olefins and an unsaturated monomer(s) that includes an anhydride functionality, and blends of polyolefins and one or more compounds that include anhydride functionality. Examples of this class of polyolefins include BYNEL™ resin (DuPont), TYMOR™ resin (Morton International Inc.; Chicago, Ill.), ADMER™ resin (Mitsui Petrochemical Corp; Tokyo, Japan), PLEXAR™ 360 RESIN (Quantum Co.; Cincinnati, Ohio), and the LOTADER™ series of ethylene/ alkyl acrylate/ maleic anhydride interpolymers (Elf-Atochem, Inc.; Buffalo, N.Y.). Regardless of the identity of the particular α-olefin(s) and material(s) including anhydride functionality, the resulting polymer or blend preferably includes between about 0.1 and about 10 weight percent anhydride functionality, more preferably between about 0.5 to about 7.5 weight percent anhydride functionality, even more preferably between about 1 and about 5 weight percent anhydride functionality, and most preferably between about 2 and about 4 weight percent anhydride functionality.

The third class of useful polymers are homo- and interpolymers of lactic acid. Particularly where the multilayer structure is to undergo heat sealing, those polymers having a melting point of no more than about 200° C., preferably no more than about 190° C., more preferably no more than about 180° C., and most preferably no more than about 170° C. are preferred.

The fourth class of useful polymers are polyamides (i.e., nylons). Suitable polyamides from which the outer layer can be formed include one or more of the following: polyamide 6, polyamide 66, polyamide 9, polyamide 10, polyamide 11, polyamide 12, polyamide 69, polyamide 610, polyamide 612, polyamide 61, polyamide 6T, polyamide MXD/6, and copolymers thereof. Examples of preferred polyamides include copolyamide 6/12, especially where the polymer includes from about 20 to about 80 weight percent mer units derived from caprolactam and from about 20 to 80 weight percent mer units derived from laurolactam; polyamide 12; copolyamide 66/69/61, especially where the polymer includes (a) from about 10 to about 50 weight percent, more preferably from about 20 to about 40 weight percent, mer units derived from hexamethylene adipamide, (b) from about 10 to about 50 weight percent, more preferably from about 20 to 40 weight percent, mer units derived from hexamethylene azelaamide, and (c) from about 10 to 60 weight percent, more preferably from about 10 to 40 weight percent, mer units derived from hexamethylene isophthalamide; copolyamide 66/610; copolyamide 6/66; and copolyamide 6/69. Particularly where first polymeric film 11 is to be involved in heat sealing, polyamides having melting points of no more than about 200° C., preferably no more than about 190° C., more preferably no more than about 180° C., and most preferably no more than about 170° C. can be preferable. Combining a relatively low melting polyamide (e.g., one having a melting point of from about 120° to about 150° C., preferably from about 130° to about 150° C.) with a higher melting polyamide (e.g., one having a melting point of from about 150° to about 200° C., preferably from about 160° to about 190° C.) can result in a blend having very desirable characteristics. An example of such a blend is a 50:50 mixture of copolyamide 6/12 and polyamide 12. Adding one or more polymers that are compatible with the polyamide or polyamide blend so as to modify the properties thereof can be beneficial for some applications. Polyolefins are an example of such a polymer.

Suitable polyolefins include polyethylene homo- and interpolymers, polypropylene homo- and interpolymers, and polybutene homo- and interpolymers. Preferred examples include ethylene/α-olefin copolymer, propylene/α-olefin copolymer, butene/α-olefin copolymer, ethylene/ unsaturated ester copolymer, and ethylene/unsaturated acid copolymer. Specific examples of preferred polyolefins include one or more of linear low density polyethylene (LLDPE), ethylene/vinyl acetate copolymer (EVA), propylene/ethylene copolymer, and propylene/butene copolymer. An ethylene/α-olefin copolymer includes mer units derived from ethylene and from one or more $C_3$ to $C_{18}$ α-olefins such as 1-butene, 1-pentene, 1-hexene, 1-octene, 4-methyl-1-pentene, and the like. The resulting polymer molecules include long chains with relatively few side chain branches; in addition, the side branching that is present is short compared to non-linear polyethylenes (e.g., low density homopolyethylene). Ethylene/α-olefin copolymers generally have a density in the range of from about 0.86 g/cm$^3$ to about 0.94 g/cm$^3$. LLDPE generally is understood to include that group of ethylene/α-olefin copolymers which fall into the density range of about 0.915 to about 0.94 g/cm$^3$. Sometimes, linear polyethylenes having densities of from about 0.926 to about 0.94 g/cm$^3$ are referred to as linear medium density polyethylene (LMDPE). Lower density ethylene/α-olefin copolymers often are referred to as very low density polyethylene, VLDPE, which commonly are understood as being ethylene/butene copolymers with a density ranging from about 0.88 to about 0.91 g/cm$^3$ (Union Carbide Corp.; Danbury, Conn.) and ultra-low density polyethylene, ULDPE, which commonly are understood as being ethylene/octene copolymers (Dow Chemical Co.; Midland, Mich.).

Ethylene/α-olefin copolymers also include homogeneous polymers which differ structurally from heterogeneous polymers (e.g., ULDPE, VLDPE, LLDPE, and LMDPE) in that they exhibit a relatively even sequencing of comonomers within a chain, a mirroring of sequence distribution in all chains, and a similarity of length of all chains (i.e., a narrower molecular weight distribution). Furthermore, homogeneous polymers typically are prepared using single-site type catalysts (e.g., metallocenes) rather than Ziegler-Natta catalysts. Such single-site catalysts typically have only one type of catalytic site, which is believed to be the basis for the homogeneity of polymers produced thereby. Examples of commercially available homogeneous polymers include metallocene catalyzed EXACT™ linear ethylene/α-olefin copolymers (Exxon Chemical Co.; Baytown, Tex.); TAFMER™ linear ethylene/α-olefin copolymers (Mitsui Petrochemical Corp.); and AFFINITY™ long-chain, branched ethylene/α-olefin copolymers (Dow Chemical Co.).

The fifth class of useful polymers are polyesters. Although many polyesters have melting points that are too high to make them good candidates for seal layers in cook-in films, those with melting points of no more than about 200° C., preferably no more than about 190° C., more preferably no more than about 180° C., and most preferably no more than about 170° C. can be useful in accordance with the present invention. An exemplary polyester is KODA-BOND™ Copolyester 5116 (Eastman Chemical Co.; Kingsport, Tenn.), which has a melting point of about 180° C.

The sixth class of polymers that have been found to be useful in connection with first polymeric film 11 are polyurethanes, particularly those with melting points of no more than about 200° C., preferably no more than about 190° C., more preferably no more than about 180° C., and most preferably no more than about 170° C. Those of ordinary skill in the art are aware of numerous types of polyurethanes, including many having melting points within the foregoing preferred ranges.

Although six classes of polymers useful in first polymeric film 11 have been exemplified herein, the skilled artisan likely can envision other types of polymers that meet the previously discussed adhesion and softening point requirements. Such additional classes of polymers also can be used in first polymeric film 11.

Of the foregoing classes of polymers, the first and fourth are preferred. Because of their relatively low cost and excellent performance characteristics, the first class of polymers is particularly preferred. Most preferred among these are the NUCREL™ ARX ethylene/acrylic acid copolymers.

In addition to the foregoing adhesion and softening point requirements, the polymer(s) to be used in first polymeric film 11 preferably has/have a melt flow index ranging from about 0.1 to 1,000 g/10 min., more preferably from about 0.5 to 500g/10 minutes, and most preferably from about 1 to 50 g/10 min. as measured according to ASTM D-1238 (at 235° C. and 1 kg).

In addition to at least one of the foregoing six classes of polymers, first polymeric film 11 can include one or more other polymers (such as was described in connection with polyamides, supra). Examples of polymers that can be blended with at least one of the foregoing six classes of polymers include polyolefins, polystyrenes, ethylene/vinyl alcohol copolymers (EVOH), and the like; particularly preferred amongst these are polyolefins and polystyrenes. Preferred types of polyolefins were described previously.

Blending one or more polymers with a relatively high Vicat softening point—i.e., a Vicat softening point of from about 85° to about 160° C., preferably from about 90° to about 130° C., more preferably from about 95° to about 125° C., and most preferably from about 100° to about 120° C.—with the polymer(s) having a relatively low Vicat softening point (and chosen from one of the six classes of polymers described supra) can be preferable for some applications such as, for example, where one desires to increase the ability of first polymeric film 11 to withstand cook-in conditions. Nevertheless, first polymeric film 11 preferably includes only polymers having melting points of no more than about 200° C., preferably no more than about 190° C., more preferably no more than about 180° C., and most preferably no more than about 170° C. Also, especially where the food product has a relatively high fat content and relatively low protein content (e.g., ham, sausage, mortadella, bologna, braunschweiger, etc.), incorporation of non-polar polymers into first polymeric film 11 can reduce its ability to adhere to the food product; accordingly, at least about 20% (by wt.), preferably at least about 30% (by wt.), more preferably at least about 40% (by wt.), even more preferably about 50% (by wt.), and most preferably at least about 75% (by wt.) of first polymeric film 11 is derived from one or more polymers from the six classes set forth above.

Preferably, first polymeric film 11 includes at least one type of antioxidant which can be present in an amount of from about 50 to about 10,000 parts per million (ppm), preferably from about 100 to about 5000 ppm, and more preferably from about 200 to about 1000 ppm. The presence of an antioxidant can be particularly useful where first polymeric film 11 or multilayer structure 10 is to be irradiated. The presence of an antioxidant is preferred where first polymeric film 11 includes an α-olefin/unsaturated acid interpolymer having a Vicat softening point falling within the aforedescribed formula because such polymers are believed to be more susceptible to crosslinking than previously available α-olefin/acrylic acid copolymers (e.g., ionomers). Seal layers including a crosslinked polymer are relatively difficult to hermetically heat seal; accordingly, the presence of crosslinked polymers normally is undesirable.

Although first polymeric film 11 can be blown or cast, it preferably is oriented, most preferably biaxially oriented. Orienting techniques are well known in the art. First polymeric film 11 can have a Young's modulus ranging from about 20 to 3400 MPa.

If desired or if necessary to increase its adhesion to the food product, outer surface 14 can be corona treated. This involves bringing first polymeric film 11 into proximity with an ionized, oxygen- or nitrogen-containing gas such as ambient air. Various forms of plasma treatment known to those of ordinary skill in the art can be used to corona treat outer surface 14. Exemplary techniques are described in, for example, U.S. Pat. Nos. 4,120,716 (Bonet) and U.S. Pat. No. 4,879,430 (Hoffman), the disclosures of which are incorporated herein by reference.

Second polymeric film 12 can be classified generally as a barrier film; specifically, at about 23° C. and 0% relative humidity, it has an oxygen permeance of no more than about 150 $cm^3/m^2 \cdot atm \cdot 24$ hours. In ascending order of preference, second polymeric film 12 preferably has an oxygen permeance of no more than about 125 $cm^3/m^2 \cdot atm \cdot 24$ hours, 100$cm^3/m^2 \cdot atm \cdot 24$ hours, 75 $cm^3/m^2 \cdot atm \cdot 24$ hours, 50 $cm^3/m^2 \cdot atm \cdot 24$ hours, 30 $cm^3/m^2 \cdot atm \cdot 24$ hours, 20 $cm^3/m^2 \cdot atm \cdot 24$ hours, and 10 $cm^3/m^2 \cdot atm \cdot 24$ hours.

Representative examples of polymers that can be useful in second polymeric film 12 include EVOH, polyvinylidene chloride (PVDC), polyamides, polyesters, and polyalkylene carbonates. Preferred polymers for use in second polymeric film 12 include EVOH and polyamides, with the former being most preferred. In particular, EVOH having from about 32 to about 48 mole percent, more preferably from about 38 to about 44 mole percent, mer units derived from ethylene can provide excellent barrier characteristics.

Second polymeric film 12 can be blown, cast, or oriented, preferably biaxially oriented, according to techniques well known in the art. Optionally, second polymeric film 12 can be heat set or annealed at a temperature from about 60° to 200° C., preferably from about 70° to 150° C., and more preferably from about 80° to 90° C.

In a preferred embodiment, one of first and second polymeric films 11 and 12 is non-heat shrinkable while the other is biaxially oriented and possesses marginal (i.e., no more than about 5%) free shrink in the transverse direction. Even more preferably, the film that is to contact a packaged food product (i.e., first polymeric film 11 in this case) is non-heat shrinkable and the other film (i.e., second polymeric film 12 in this case) is biaxially oriented and heat shrinkable. In a preferred embodiment, multilayer structure 10 has marginal free shrink in the transverse direction.

Second polymeric film 12 is laminated to first polymeric film 11 by adhesive 13. Materials that can be used as adhesive 13 include solvent-based (e.g., polyurethanes) and solvent-free resins.

Multilayer structure 10 can have a longitudinal direction free shrink of at least 1% and a transverse direction free shrink of at least about 1% (both measured at 85° C.). Additionally, multilayer structure 10 can have a free shrink (at 85° C.) in at least one of the longitudinal (L) and transverse (T) directions of at least 2%, at least 5%, at least 10%, at least 15%, at least 20%, at least 25%, even up to 50%. Preferably, multilayer structure 10 is biaxially oriented and preferably has a free shrink (at 85° C.) of from about 1 to about 20%, more preferably from about 2 to about 15%, and even more preferably from about 3 to about 10%, in each of the L and T directions and a total free shrink (L+T) of from about 2 to about 40%, preferably from about 2.5 to about 30%, more preferably from about 3 to about 20%, and still more preferably from about 5 to about 15%.

For certain applications, orienting then heat setting or annealing multilayer structure 10 (or, alternatively, one or both of first polymeric film 11 and second polymeric film 12 so as to provide a T direction free shrink (at 85° C.) of less than 10%, more preferably less than 5%, can be preferred. Heat setting can be done at a temperature from about 60° to 200° C., preferably from about 70° to 150° C., and more preferably from about 80° to 90° C.

Although multilayer structure 10 is shown with adhesive 13 laminating first polymeric film 11 to second polymeric film 12, adhesive 13 need not be present where some other laminating technique is employed. The ordinarily skilled artisan is aware of such techniques including, for example, corona lamination.

Although not necessary to its utility, multi layer structure 10 can be irradiated by subjecting it to radiation such as corona discharge, plasma, flame, ultraviolet, X-ray, gamma ray, beta ray, and high energy electron treatment. Such radiation can alter the surface of the multilayer structure 10 and/or induce crosslinking between molecules of the polymers contained therein. The use of ionizing radiation for crosslinking polymers present in a film structure is disclosed in U.S. Pat. No. 4,064,296 (Bornstein et al.), the teaching of which is incorporated herein by reference. Radiation dosages often are measured in the unit RAD, with one million RADS being designated as "MR", or in terms of the unit kiloGray (kGy) with 10 kGy representing 1 MR. To produce crosslinking, the polymer is subjected to a suitable radiation dosage of high energy electrons (although radiation is not limited to electrons from an accelerator since any ionizing radiation can be used), preferably using an electron accelerator (although other accelerators, such as a Van de Graaff or resonating transformer, can be used). A suitable dosage of high energy electrons, as measured by standard dosimetry techniques, is in the range of up from about 16 to about 166 kGy, more preferably about 30 to about 139 kGy, and still more preferably from about 50 to about 100 kGy. The actual amount of radiation used on a particular multilayer structure is dependent upon its components and end use.

Figure 2:
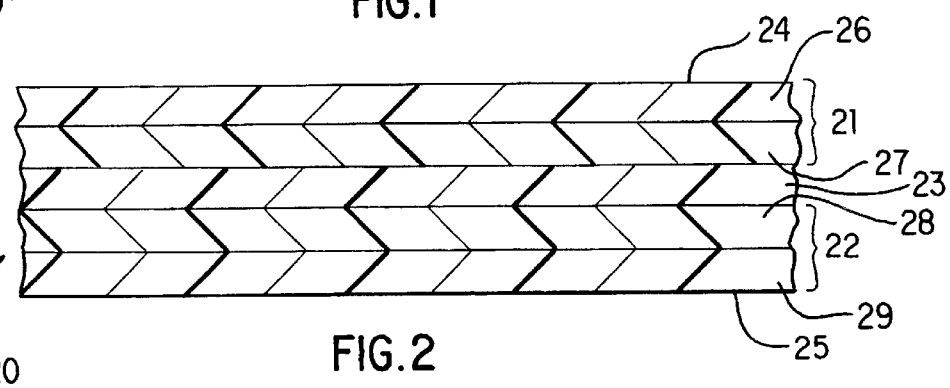
FIG. 2 is a greatly enlarged cross sectional view of another embodiment of a multilayer structure according to the present invention.

Referring now to FIG. 2, multilayer structure 20 includes first polymeric film 21 and second polymeric film 22. The surface of first polymeric film 21 that is most distant from second polymeric film 22 forms one outer surface 24 of multilayer structure 20; the surface of second polymeric film 22 that is most distant from first polymeric film 21 forms the other outer surface 25 of multilayer structure 20. First polymeric film 21 is laminated to second polymeric film 22 by means of adhesive 23. As was described previously, other laminating means (e.g., corona lamination) can be used in place of adhesive 23.

Both of films 21 and 22 are multilayer films although, as described previously with respect to FIG. 1, either or both can be monolayer films. More specifically, each of films 21 and 22 includes two layers. For the sake of simplicity in the following discussion, first polymeric film 21 is assumed to meet the surface energy and softening point requirements while second polymeric film 22 is assumed to have the required oxygen permeance.

First polymeric film 21 includes seal layer 26 and bulk layer 27. Seal layer 26 is the outer layer which has the above-described necessary surface energy (i.e., an untreated surface energy of at least 0.34 J/m$^2$) and includes at least about 10% (by wt.) of one or more polymers having the necessary Vicat softening point. One surface of seal layer 26 forms outer surface 24 of multilayer structure 20. Seal layer 26 can be made in the same manner and of the same materials as set forth previously in relation to first polymeric film 11 of FIG. 1. Seal layer 26 preferably has a thickness of from about 1 to about 125 μm, more preferably from about 2.5 to about 50 μm, even more preferably from about 5 to about 25 μm, and most preferably from about 7.5 to about 20 μm.

Bulk layer 27 includes one or more of the following: a polyolefin such as those described supra, particularly EVA, ethylene/alkyl acrylate copolymers (e.g., copolymers of ethylene with methyl acrylate, ethyl acrylate, butyl acrylate, etc.), LDPE, and ethylene/α-olefin copolymers (e.g., LLDPE, VLDPE, etc.); a polystyrene such as those described supra; a polyamide such as those described supra; a polyester such as those described supra; a polyurethane; EVOH; PVDC; a polyether; and a polycarbonate. Each of the foregoing include interpolymers as well as homopolymers. Additionally, polymers blended with starch also can be used in bulk layer 27. Bulk layer 27 preferably has a thickness of from about 1 to about 125 μm, more preferably from about 2.5 to about 50 μm, even more preferably from about 5 to about 25 μm, and most preferably from about 7.5 to about 20 μm.

Either or both of seal layer 26 and bulk layer 27 can include one or more polymers other than those set forth in the preceding paragraphs. Examples of polymers that can be blended with at least one of the foregoing six classes of polymers include polyolefins, polystyrenes, EVOH, and the like; particularly preferred amongst these are polyolefins and polystyrenes such as those described previously.

One or more polymers with a relatively high Vicat softening point (i.e., a Vicat softening point of from about 85° to about 160° C., preferably from about 90° to about 130° C., more preferably from about 95° to about 125° C., and most preferably from about 100° to about 120° C.) can be blended with the polymer(s) having a relatively low Vicat softening point (and chosen from one of the six classes of polymers described supra). Nevertheless, seal layer 26 preferably includes only polymers having melting points of no more than about 200° C., preferably no more than about 190° C., more preferably no more than about 180° C., and most preferably no more than about 170° C. Also, incorporation of non-polar polymers into seal layer 26 can reduce its ability to adhere to the food product; accordingly, at least about 10% (by wt.), preferably at least about 20% (by wt.), more preferably at least about 30% (by wt.), even more preferably at least about 50% (by wt.), and most preferably at least about 75% (by wt.) of seal layer 26 is derived from one or more polymers from the six classes set forth above.

Optionally, a tie layer (not shown) can be disposed between seal layer 26 and bulk layer 27. As in other films, tie layers can aid in maintaining good interlayer adhesion between seal layer 26 and bulk layer 27. Where the polymers in seal layer 26 and bulk layer 27 are sufficiently compositionally similar, a tie layer is unnecessary.

As described previously with respect to first polymeric film 11 of FIG. 1, first polymeric film 21 can include in seal layer 26 at least one type of antioxidant in an amount of from about 50 to about 10,000 ppm, preferably from about 100 to about 5000 ppm, and more preferably from about 200 to about 1000 ppm. The presence of an antioxidant can be particularly useful where first polymeric film 21 or multilayer structure 20 is to be irradiated. The presence of an antioxidant is especially preferred where seal layer 26 includes an α-olefin/unsaturated acid interpolymer having a Vicat softening point falling within the aforedescribed formula (for the reasons discussed previously).

Although first polymeric film 21 can be blown or cast, it preferably is oriented, most preferably biaxially oriented.

First polymeric film 21 can have a Young's modulus ranging from about 20 to 3400 MPa. Outer surface 24 can be corona treated in a manner described previously if desired.

Second polymeric film 22 includes barrier layer 28 and bulk layer 29. Barrier layer 28, at about 23° C. and 0% relative humidity, has an oxygen permeance of no more than about 150 $cm^3/m^2 \cdot atm \cdot 24$ hours. In ascending order of preference, barrier layer 28 preferably has an oxygen permeance of no more than about 125 $cm^3/m^2 \cdot atm \cdot 24$ hours, 100 $cm^3/m^2 \cdot atm \cdot 24$ hours, 75 $cm^3/m^2 \cdot atm \cdot 24$ hours, 50 $cm^3/m^2 \cdot atm \cdot 24$ hours, 30 $cm^3/m^2 \cdot atm \cdot 24$ hours, 20 $cm^3/m^2 \cdot atm \cdot 24$ hours, and 10 $cm^3/m^2 \cdot atm24$ hours. Representative examples of polymers that can be useful in barrier layer 28 are the same as those set forth with respect to second polymeric film 12 of FIG. 1, namely EVOH, PVDC, polyamides, polyesters, and polyalkylene carbonates, with EVOH and polyamides being preferred, particularly the former. In particular, EVOH having from about 32 to about 48 mole percent, preferably from about 38 to about 44 mole percent, mer units derived from ethylene can provide excellent barrier characteristics.

Bulk layer 29 includes one or more polymers selected from the group set forth with respect to bulk layer 27 supra. Bulk layer 29 preferably has a thickness of from about 1 to about 125 μm, more preferably from about 2.5 to about 50 μm, even more preferably from about 5 to about 25 μm, and most preferably from about 7.5 to about 20 μm.

Second polymeric film 22 can be blown, cast, or oriented, preferably biaxially oriented. Optionally, second polymeric film 22 can be heat seat or annealed at a temperature from about 60° to 200° C., preferably from about 700 to 150° C., and more preferably from about 80° to 90° C.

Second polymeric film 22 is laminated to first polymeric film 21 by adhesive 23 which can be a material such as those described supra in connection with adhesive 13 from FIG. 1.

Multilayer structure 20 can have free shrink of at least 1% in both the L and T directions (both at a temperature of 85° C.). Additionally, multilayer structure 20 can have a free shrink (at a temperature of 85° C.) in at least one of the L and T directions of at least 2%, at least 5%, at least 10%, at least 15%, at least 20%, at least 25%, even up to 50%. Preferably, multilayer structure 10 is biaxially oriented and preferably has a free shrink (at 85° C.) of from about 1 to about 20%, more preferably from about 2 to about 15%, and even more preferably from about 3 to about 10%, in each of the L and T directions and a total free shrink (L+T) of from about 2 to about 40%, preferably from about 2.5 to about 30%, more preferably from about 3 to about 20%, and still more preferably from about 5 to about 15%.

Multilayer structure 20 can be irradiated as described above. A suitable dosage of high energy electrons is in the range of up from about 16 to about 166 kGy, more preferably about 30 to about 139 kGy, and still more preferably from about 50 to about 100 kGy.

Figure 3:
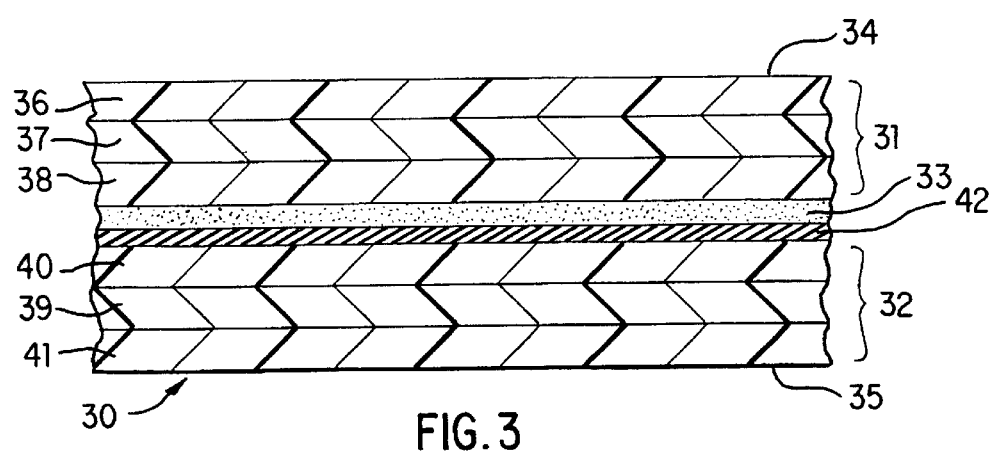
FIG. 3 is a greatly enlarged cross sectional view of another embodiment of a multilayer structure according to the present invention.

Referring now to FIG. 3, multilayer structure 30 includes first polymeric film 31 and second polymeric film 32 with the latter having disposed on one of its primary surfaces printed image 42. The surface of first polymeric film 31 that is most distant from second polymeric film 32 forms one outer surface 34 of multilayer structure 30; the surface of second polymeric film 32 that is most distant from first polymeric film 31 forms the other outer surface 35 of multilayer structure 30. First polymeric film 31 is laminated to second polymeric film 32 by means of adhesive 33. As before, other laminating means (e.g., corona lamination) can be used in place of adhesive 33.

Both of films 31 and 32 are multilayer films although either or both can be monolayer films if desired. More specifically, each of films 31 and 32 includes three layers. For the sake of simplicity, first polymeric film 31 is assumed to meet the surface energy and softening point requirements while second polymeric film 32 is assumed to have the required oxygen permeance.

First polymeric film 31 includes seal layer 36, first bulk layer 37, and second bulk layer 38. Seal layer 36 is the outer layer which has the above-described necessary surface energy (i.e., an untreated surface energy of at least 0.34 $J/m^2$) and includes at least about 10% (by wt.) of one or more polymers having the necessary Vicat softening point. One surface of seal layer 36 forms outer surface 34 of multilayer structure 30. Seal layer 36 can be made in the same manner and of the same materials as set forth previously in relation to seal layer 26 of FIG. 2. Seal layer 36 preferably has a thickness of from about 1 to about 125 μm, more preferably from about 2.5 to about 50 μm, even more preferably from about 5 to about 25 μm, and most preferably from about 7.5 to about 20 μm.

Bulk layers 37 and 38 include one or more of the polymers described as useful with respect to bulk layer 27 of FIG. 2. Each of bulk layers 37 and 38 preferably have thicknesses of from about 1 to about 125 μm, more preferably from about 2.5 to about 50 μm, even more preferably from about 5 to about 25 μm, and most preferably from about 7.5 to about 20 μm.

Any or all of seal layer 36, first bulk layer 37, and second bulk layer 38 can include one or more polymers other than those set forth in the preceding paragraphs. Examples of polymers that can be blended with at least one of the foregoing six classes of polymers include those set forth previously with respect to FIG. 2, particularly polyolefins and polystyrenes.

One or more polymers with a relatively high Vicat softening point (i.e., a Vicat softening point of from about 85° to about 160° C., preferably from about 90° to about 130° C., more preferably from about 95° to about 125° C., and most preferably from about 100° to about 120° C.) can be blended with the polymer(s) having a relatively low Vicat softening point (and chosen from one of the six classes of polymers described supra). Nevertheless, seal layer 36 preferably includes only polymers having melting points of no more than about 200° C., preferably no more than about 190° C., more preferably no more than about 180° C., and most preferably no more than about 170° C. Also, incorporation of non-polar polymers into seal layer 36 can reduce its ability to adhere to the food product; accordingly, at least about 10% (by wt.), preferably at least about 20% (by wt.), and more preferably at least about 30% (by wt.) of seal layer 36 is derived from one or more polymers from the six classes set forth above.

Optionally, to aid in maintaining good interlayer adhesion, a tie layer (not shown) can be disposed between seal layer 36 and first bulk layer 37 and/or between first bulk layer 37 and second bulk layer 38.

Although not shown in FIG. 3, other additional layers also can be present in first polymeric film 31. Specifically, up to about 15, preferably up to about 12, more preferably up to about 9, and most preferably up to about 5 additional layers can be present.

First polymeric film 31 can include in seal layer 36 at least one type of antioxidant in an amount of from about 50 to about 10,000 ppm, preferably from about 100 to about 5000 ppm, and more preferably from about 200 to about 1000 ppm. The presence of an antioxidant can be useful where first polymeric film 31 or multilayer structure 30 is to be irradiated. The presence of an antioxidant is especially preferred where seal layer 36 includes those α-olefin/ unsaturated acid interpolymers of the type described previously.

Although first polymeric film 31 can be blown or cast, it preferably is oriented, most preferably biaxially oriented. First polymeric film 31 can have a Young's modulus ranging from about 20 to 3400 MPa. Outer surface 34 can be corona treated in a manner described previously if so desired.

Second polymeric film 32 includes barrier layer 39, first bulk layer 40, and second bulk layer 41. In multilayer structure 30, barrier layer 39 is disposed between bulk layers 40 and 41. Although preferred, this is not a necessary to the utility of multilayer structure 30.

Barrier layer 39, at about 23° C. and 0% relative humidity, has an oxygen permeance of no more than about 150 $cm^3/m^2 \cdot atm \cdot 24$ hours. In ascending order of preference, barrier layer 39 preferably has an oxygen permeance of no more than about 125 $cm^3/m^2 \cdot atm \cdot 24$ hours, 100 $cm^3/m^2 \cdot atm \cdot 24$ hours, 75 $cm^3/m^2 \cdot atm \cdot 24$ hours, 50 $cm^3/m^2 \cdot atm \cdot 24$ hours, 30 $cm^3/m^2 \cdot atm \cdot 24$ hours, 20 $cm^3/m^2 \cdot atm \cdot 24$ hours, and 10 $cm^3/m^2 \cdot atm \cdot 24$ hours. Representative examples of polymers that can be useful in barrier layer 39 are the same as those set forth with respect to second polymeric film 12 of FIG. 1, namely EVOH, PVDC, polyamides, polyesters, and polyalkylene carbonates, with EVOH and polyamides being preferred, particularly the former. In particular, EVOH having from about 32 to about 48 mole percent, preferably from about 38 to about 44 mole percent, mer units derived from ethylene can provide excellent barrier characteristics.

Bulk layers 40 and 41 include one or more of the polymers described as useful with respect to bulk layer 29 of FIG. 2. Each of bulk layers 40 and 41 preferably have thicknesses of from about 1 to about 125 μm, more preferably from about 2.5 to about 50 μm, even more preferably from about 5 to about 25 μm, and most preferably from about 7.5 to about 20 μm.

Optionally, to aid in maintaining good interlayer adhesion, a tie layer (not shown) can be disposed between barrier layer 39 and first bulk layer 40 and/or second bulk layer 41. Other additional layers also can be present in second polymeric film 32. Specifically, up to about 15, preferably up to about 12, more preferably up to about 9, and most preferably up to about 5 additional layers optionally can be present.

Second polymeric film 32 can be blown, cast, or oriented, preferably biaxially oriented. Optionally, second polymeric film 32 can be heat seat or annealed at a temperature from about 60° to 200° C., preferably from about 70° to 150° C., and more preferably from about 80° to 90° C.

Disposed on the primary surface of second polymeric film 32 opposite outer surface 35 is printed image 42. Although being shown disposed on second polymeric film 32, printed image 42 (or, more accurately, the reverse thereof) can be disposed on the primary surface of first polymeric film 31 opposite outer surface 34. To assist in maintaining good adhesion to printed image 42, first bulk layer 40 (or second bulk layer 38 if printed image 42 is disposed on first polymeric film 31) can be corona treated or an interlayer adhesive can be used. By placing printed image 42 in the interior of multilayer structure 30, it is protected from scuffing and other abuse normally encountered during shipping and display.

Second polymeric film 32 is laminated to first polymeric film 31 by adhesive 33 which can be a material such as was described supra in connection with the multilayer structures of FIGS. 1 and 2. This is done after printed image 42 is disposed on second polymeric film 32 (or, if desired, first polymeric film 31).

Multilayer structure 30 can have free shrink of at least 5% in both the L and T directions (both at a temperature of 85° C.). Additionally, multilayer structure can have a free shrink (at a temperature of 85° C.) in at least one of the L and T directions of at least 5%, at least 10%, at least 15%, at least 20%, at least 25%, even up to 50%. Preferably, multilayer structure 30 is biaxially oriented and preferably has a free shrink (at 85° C.) of from about 2 to about 20%, more preferably from about 3 to about 15%, in each of the L and T directions and a total free shrink (L+T) of from about 5 to 40%.

Multilayer structure 30 can be irradiated as described above. A suitable dosage of high energy electrons is in the range of up from about 16 to about 166kGy, more preferably about 30 to about 139 kGy, and still more preferably from about 50 to about 100 kGy.

In all of the foregoing multilayer structures, the second polymeric film has been the barrier film. However, the present invention also encompasses embodiments where the first polymeric film acts as the barrier film as well as possessing the necessary adhesion and softening point characteristics. For example, should a first polymeric film include a layer derived from, for example, EVOH or PVDC, that film can provide each of the adhesion, softening point, and barrier characteristics to the multilayer structure in which it is incorporated. In such a circumstance, the second polymeric film can be formed from practically any thermoplastic polymer.

In all of the films in the foregoing multilayer structures, one or more of the layers of such films can, if desired, contain appropriate amounts of additives.

Examples of commonly used additives include slip agents (e.g., talc), fillers, dyes, pigments, radiation stabilizers, antistatic agents, elastomers, and the like. The use of antioxidants in such films has been described previously.

In each of the foregoing multilayer structures, the component films have been described as heat shrinkable or non-heat shrinkable. Those of ordinary skill in the art are aware of the various methods available to make both of these types of films. However, a brief discussion of methodology will be undertaken for the convenience of the reader.

Non-heat shrinkable films can be made by a variety of methods, each of which results in a film where the polymer chains of one or more of the layers of that film are random, i.e., unoriented. Of course, if one were to form the film from non-orientable materials, an unoriented film results. More commonly, film casting or (co)extrusion casting are employed. Also more common is the use of the "hot blown" process. This process involves taking an extruded (or coextruded) film, immediately after extrusion and without the standard cooling step, and stretching it while it is held at a temperature in excess of its orientation temperature; thereafter, the substantially unoriented film is cooled.

Heat shrinkable films likewise can be made by a variety of methods. However, most of these methods involve the same general principles, differing only in a few details. In general, a film is (co)extruded and immediately cooled (by, for example, water quenching) below its orientation temperature. Thereafter, the unoriented film is stretched in one or both of the L and T directions. This stretching normally is accomplished by tenter framing or one of a variety of bubble techniques. The stretched film then is cooled rapidly so that it retains its stretched dimensions. This locks in the orientation of the polymer chains. Films that have been stretched to a greater extent tend to exhibit larger free shrink, shrink tension, and orientation release stress values (as measured by ASTM D 2732-70, ASTM D 2838-81, and ASTM D 2838-81, respectively).

Regardless of the heat shrink characteristics of the two component films, they are laminated together to form the multilayer structure of the present invention. This involves bonding the separately made films to form an essentially unitary structure. This bonding typically is accomplished through the use of a separate adhesive layer or the application of heat and pressure. (Of course, if heat is to be used in the bonding process and one or both of the component films are heat shrinkable, the amount of heat used preferably is not sufficient to raise the oriented film(s) above its/their orientation temperature(s).) The actual bonding can be accomplished either as a batch process or in-line.

Figure 4:
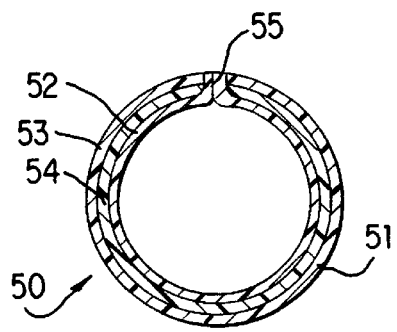
FIG. 4 is an end-on view, not to scale, of a butt sealed casing of one embodiment of a multilayer structure according to the present invention.

Referring now to FIG. 4, in multilayer structure 51, first polymeric film 52 is laminated to second polymeric film 53 by adhesive 54. In composition and ordering, multilayer structure 51 corresponds substantially to multilayer structure 10 from FIG. 1.

Tube (or casing) 50 has been formed from multilayer structure 51 by fin sealing first polymeric film 52 to itself. Fin seal 55 is created by folding multilayer structure 51 such that one edge of first polymeric film 52 is brought into contact with the opposite edge thereof followed by the application of heat so as to form a seal. Fin seal 55 continues along substantially the full length (not shown) of tube 50.

Figure 5:
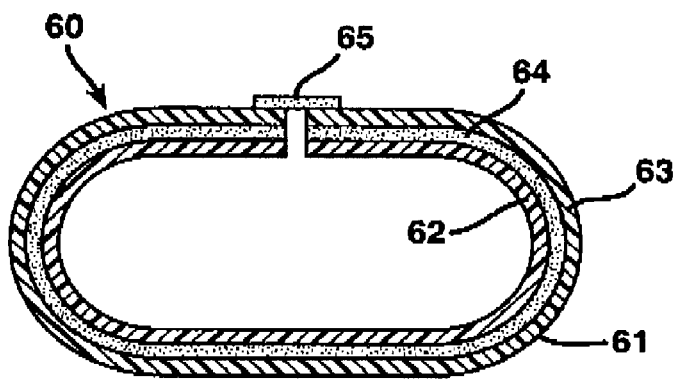
FIG. 5 is an end-on view, not to scale, of another butt sealed casing of one embodiment of a multilayer structure according to the present invention.

Referring now to FIG. 5, in multilayer structure 61, first polymeric film 62 is laminated to second polymeric film 63 by adhesive 64, which can be a pressure sensitive, a hot melt, etc., type of adhesive. In composition and ordering, multilayer structure 61 corresponds substantially to multilayer structure 10 from FIG. 1.

In each of the foregoing multilayer structures, the oxygen permeance preferably ranges from about 0.05 to about 150 $cm^3/m^2 \cdot atm \cdot 24$ hours, more preferably from about 0.1 to about 100 $cm^3/m^2 \cdot atm \cdot 24$ hours, even more preferably from about 1 to about 75 $cm^3/m^2 \cdot atm \cdot 24$ hours, still further more preferably from about 5 to about 50 $cm^3/m^2 \cdot atm \cdot 24$ hours, and most preferably from about 10 to about 30 $cm^3/m^2 \cdot atm \cdot 24$ hours. Each of the preceding oxygen permeances is measured at about 23° C. and 0% relative humidity.

Tube 60 has been formed from multilayer structure 61 by sealing first polymeric film 62 to adhesive 65 after folding multilayer structure 61 such that one edge of first polymeric film 62 is brought into contact with the opposite edge thereof. (Although adhesive 65 is shown as being along the exterior of multilayer structure 61, it optionally can be along the interior of that structure.) The application of heat completes the formation of a seal between first polymeric film 62 to adhesive 65. The resulting seal continues along substantially the full length (not shown) of tube 60.

Figure 6:
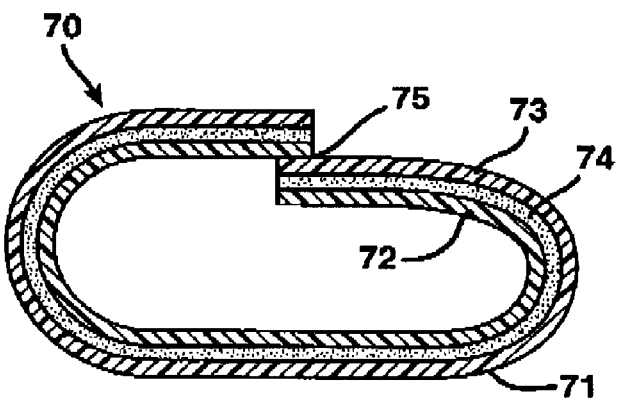
FIG. 6 is an end-on view, not to scale, of a lap sealed casing of one embodiment of a multilayer structure according to the present invention.

Referring now to FIG. 6, in multilayer structure 71, first polymeric film 72 is laminated to second polymeric film 73 by adhesive 74. In composition and ordering, multilayer structure 71 corresponds substantially to multilayer structure 10 from FIG. 1.

Tube 70 has been formed from multilayer structure 71 by lap sealing first polymeric film 72 to second polymeric film 73 after folding multilayer structure 71 such that a small portion of first polymeric film 72 is brought into contact with a small portion of second polymeric film 73 followed by the application of heat so as to form a seal. Lap seal 75 continues along substantially the full length (not shown) of tube 70.

Each of tubes 50, 60, and 70 can be prepared from their corresponding multilayer structures. The respective structure is longitudinally folded by passing over the forming piece (sometimes called a "shoe") of, for example, a NISHIBE™ HSP-250-SA backseaming machine (Nishibe Kikai Co. Ltd.; Nagoya, Japan), a TOTANI™ FD-350C sealing machine (Totani Giken Kogyo Co., Ltd.; Kyoto, Japan), a POLYCLIP™ TSA-120 horizontal form-seal-stuff-clip machine (Polyclip Corp.; Chicago, Ill.) or, an ONPACK™ 2002 vertical form-fill-seal machine (Orihiro Co., Ltd.; Tomioka City, Japan). The multilayer structure is passed under and around the forming shoe so as to form a cylinder with the circumference and diameter thereof being determined by the size of the forming shoe. The multilayer structure is overlapped in one of the above-described ways, and a seal is created through the application of heat to the overlap area.

From the foregoing discussion of tube formation, one can see the reason for the aforementioned Vicat softening point limitation imposed on at least one of the polymers of the first polymeric film of the multilayer structure of the present invention. The first polymeric film is to be sealed to an adhesive (a butt seal), the second polymeric film (a lap seal), or itself (a fin seal). Where the first polymeric film is to be sealed to the second polymeric film or to an adhesive tape, ensuring that at least one of the polymers in the first polymeric film and at least one of the polymers in the second polymeric film or adhesive tape (whichever is used) are seal compatible is desired. In other words, providing a second polymeric film (or adhesive tape) with at least one polymer that is, from the standpoint of composition and polarity, similar to the polymer of the first polymeric film chosen from one of the six classes described supra is preferable. Otherwise, the strength of the longitudinal seal (i.e., backseam) can be compromised. The backseam preferably has a seal strength of at least about 13.5 kPa, more preferably at least about 25 kPa, even more preferably about 40 kPa, yet still more preferably at least about 60 kPa, and most preferably at least about 80 kPa.

The lay flat width (i.e., one half the circumference) of any of tubes 50, 60, and 70 can range from about 2.5 to about 100 cm, preferably from about 5 to about 50 cm, more preferably from about 7 to about 30 cm, even more preferably from about 8.5 to about 25 cm, and most preferably from about 10 to about 20 cm. The particular lay flat width of any given tube depends on the particular end use application. Where a significant amount of food product is to be packaged, a larger lay flat width is preferred.

Figure 7:
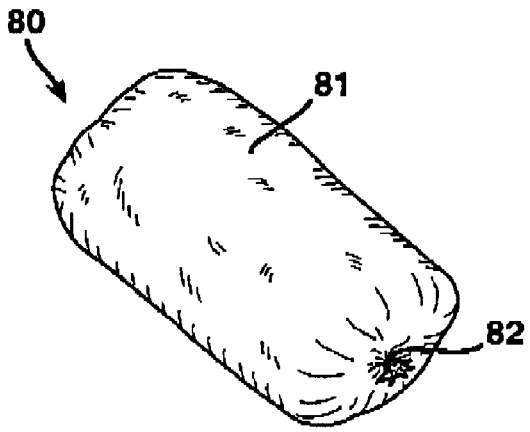
FIG. 7 is a perspective view, not to scale, of one embodiment of a packaged product according to the present invention.

Any of tubes 50, 60, and 70 can be further processed so as to form a cook-in package according to techniques well known in the art. Referring now to FIG. 7, package 80 is formed from casing 81 clipped at each end thereof, with only one clip 82 being illustrated in the perspective view shown. Casing 81 can be made from any of the previously described multilayer structures (i.e., see FIGS. 1 through 3 and accompanying text, supra) which has been formed into a tube (i.e., see FIGS. 4 through 6 and accompanying text, supra). Specifically, casing 81 can be formed by clipping one end of such a tube, filling the resulting open container with the desired food product, then clipping shut the open end of the container.

Once formed, package 80 can be used to store the enclosed food product (not shown) or, alternatively, the food product can be processed, e.g., cooked, while in package 80. Preferably, the food product is proteinaceous, more preferably a meat product that includes one or more of ham, poultry, beef, sausage, and braunschweiger, most preferably at least one of ham, poultry, and beef.

Other package structures are possible and readily apparent to the ordinarily skilled artisan. The present invention is not to be limited to the particular structures described above.

Regardless of the particular form that a package according to the present invention takes, it preferably limits the amount of free moisture in the package (i.e., cook-out) to no more than 5% (by weight) based on the weight of the food product prior to cooking. In ascending order of preference, a package according to the present invention more preferably limits the amount of free moisture to no more than 3%, 1%, 0.75%, 0.5%, 0.25%, and 0.1% (with all of the foregoing percentages being weight percentages) when the package is used under standard cook-in conditions.

Various modifications and alterations that do not depart from the scope and spirit of this invention will become apparent to those skilled in the art. This invention is not to be unduly limited to the illustrative embodiments set forth herein.

We claim:

1. A multilayer structure comprising:
   a first polymeric film;
   a second polymeric film aminated to said first polymeric film made separately from the first polymeric film; and
   wherein:
      one of the first and second polymeric films is heat shrinkable and the other of the first and second polymeric films is non-heat shrinkable;
      at least one of said first and second polymeric films has an oxygen permeance of no more than about 150 $cm^3/m^2 \cdot atm \cdot 24$ hours at 23° C. and 0% relative humidity;
      said first polymeric film comprises:
         a first polymeric film outer layer which, even when untreated, has a surface energy of at least 0.034 $J/m^2$; and
         at least about 10 weight percent of one or more polymers having a Vicat softening point of at least about 65° C.;
      said first polymeric film outer layer forms a first outer surface of said multilayer structure; and
      said second polymeric film comprises a second polymeric film outer layer which forms a second outer surface of said multilayer structure.

2. The multilayer structure of claim 1 wherein said second polymeric film has an oxygen permeance of no more than about 150 $cm^3/m^2 \cdot atm \cdot 24$ hours at 23° C. and 0% relative humidity.

3. The multilayer structure of claim 1 wherein said second polymeric film has an oxygen permeance of no more than about 50 $cm^3/m^2 \cdot atm \cdot 24$ hours at 23° C. and 0% relative humidity.

4. The multilayer structure of claim 1 wherein said second polymeric film has an oxygen permeance of no more than about 25 $cm^3/m^2 \cdot atm \cdot 24$ hours at 23° C. and 0% relative humidity.

5. The multilayer structure of claim 1 wherein said first and second polymeric films are adhesively laminated to one another.

6. The multilayer structure of claim 1 wherein said outer layer of said first polymeric film has an untreated surface energy of at least 0.036 $J/m^2$.

7. The multilayer structure of claim 1 wherein said outer layer of said first polymeric film has an untreated surface energy of at least 0.038 $J/m^2$.

8. The multilayer structure of claim 1 wherein said outer layer of said first polymeric film has an untreated surface energy of at least 0.040 $J/m^2$.

9. The multilayer structure of claim 1 wherein said outer layer of said first polymeric film has an untreated surface energy of at least 0.042 $J/m^2$.

10. The multilayer structure of claim 1 wherein said one or more polymers of said outer layer of said first polymeric film have a Vicat softening point of at least about 70° C.

11. The multilayer structure of claim 1 wherein said one or more polymers of said outer layer of said first polymeric film have a Vicat softening point of at least about 75° C.

12. The multilayer structure of claim 1 wherein said outer layer of said first polymeric film comprises at least 10 weight percent of one or more polymers selected from:
   a) a polymer comprising mer units derived from a $C_2$–$C_4$ α-olefin and comprising anhydride functionality;
   b) a polymer comprising mer units derived from lactic acid;
   c) a polyamide;
   d) a polyester; and
   e) a polyurethane.

13. The multilayer structure of claim 1 wherein said outer layer of said first polymeric film comprises at least 10 weight percent of an interpolymer comprising mer units derived from at least one $C_2$–$C_4$ α-olefin and at least about 2 weight percent mer units derived from at least one $C_3$–$C_{18}$ unsaturated acid.

14. The multilayer structure of claim 13 wherein said interpolymer has a Vicat softening point, V, of $$V \geq 111° C. - 2.78° C.(m_A)$$

where $m_A$ is the weight percent of mer units in said interpolymer derived from said $C_3$–$C_{18}$ unsaturated acid with $m_A$ ranging from about 2 to about 25, inclusive.

15. The multilayer structure of claim 14 wherein $m_A$ ranges from about 4 to about 15, inclusive.

16. The multilayer structure of claim 15 wherein $m_A$ ranges from about 6 to about 12, inclusive.

17. The multilayer structure of claim 13 wherein said at least one $C_2$–$C_4$ α-olefin comprises ethylene.

18. A tube formed from the multilayer structure of claim 1 by lap sealing said first outer surface to said second outer surface.

19. A tube formed from the multilayer structure of claim 1 by butt sealing said first outer surface to itself or to an adhesive tape applied over a seam created by contacting said first outer surface with itself.

20. The multilayer structure of claim 1 further comprising a printed image disposed between the first and second polymeric films.

21. The multilayer structure of claim 1 wherein the multilayer structure has a total free shrink of from about 2% to 40% measured at 85° C.

* * * * *

UNITED STATES PATENT AND TRADEMARK OFFICE
CERTIFICATE OF CORRECTION

PATENT NO. : 6,656,548 B1  
DATED : December 2, 2003  
INVENTOR(S) : Beckwith et al.

It is certified that error appears in the above-identified patent and that said Letters Patent is hereby corrected as shown below:

Column 21,
Line 19, "aminated" should be -- laminated --.
Line 20, insert the word -- and -- immediately before the word "made".

Signed and Sealed this

Sixth Day of April, 2004

JON W. DUDAS
*Acting Director of the United States Patent and Trademark Office*